June 2, 1953  M. E. LEE  2,640,661
FISHING REEL
Filed Aug. 31, 1948
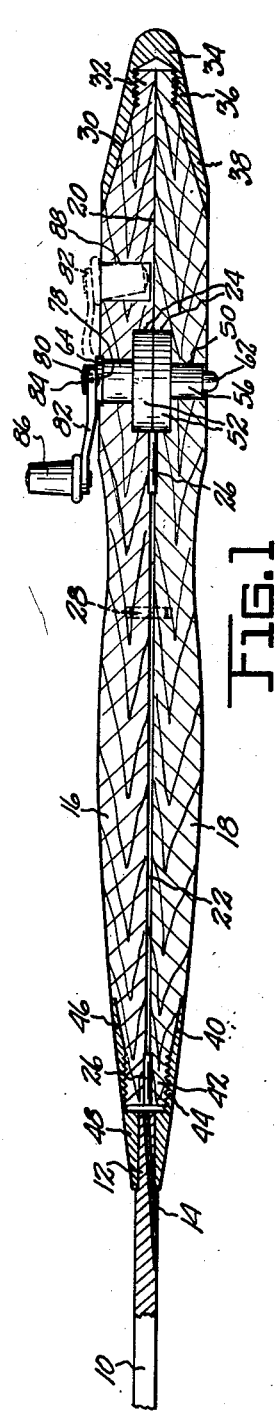
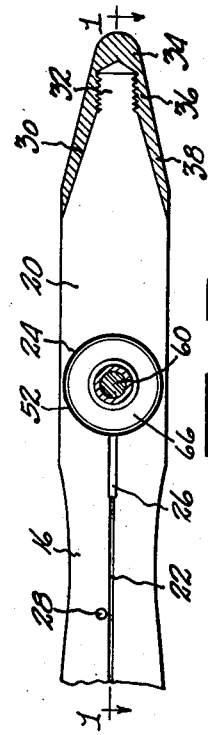
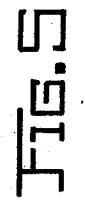
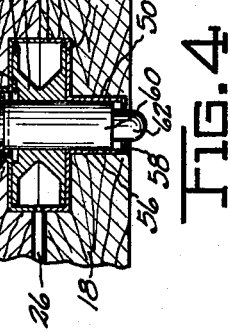
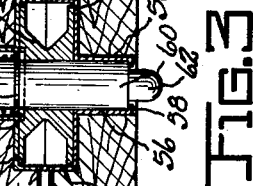
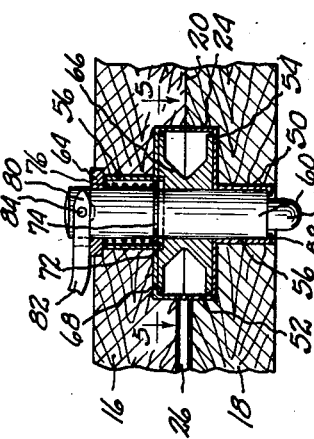
INVENTOR
MATTHEW E. LEE.
BY
Oltsch & Knoblock.
ATTORNEYS Patented June 2, 1953

2,640,661

UNITED STATES PATENT OFFICE 2,640,661

FISHING REEL

Matthew E. Lee, South Bend, Ind.

Application August 31, 1948, Serial No. 47,095

1 Claim. (Cl. 242—84.7)

This invention relates to improvements in fishing rods, and more particularly to a rod of a character having a socket formed therein adapted to receive a fishing reel confined within the outline of the rod.

The primary object of the invention is to provide a simple and inexpensive device of this construction which is easy to assemble, trouble-free in operation, and wherein the number of parts is reduced to a minimum.

A further object is to provide a device of this character wherein all of the confined moving parts adjacent to or adapted to be contacted by a line have a clearance with adjacent parts less than the thickness of a line so that the danger of failure of the device in operation, due to accidental clamping or binding of the line in clearance spaces, is avoided.

A further object is to provide a device of this character having a crank-operated reel, wherein a detachable connection is provided between the crank and the reel adapted in certain positions of the parts to operatively engage said crank and reel and in other operative positions to permit free spinning of the reel relative to the crank.

Other objects will be apparent from the following specification.

In the drawing:

Fig. 1 is a longitudinal sectional view taken on line 1—1 of Fig. 2.

Fig. 2 is a fragmentary inner face view of one portion of the reel handle with associated parts illustrated in section.

Fig. 3 is an enlarged fragmentary sectional view taken on line 1—1 of Fig. 2 and illustrating one operative position of the parts.

Fig. 4 is an enlarged sectional view similar to Fig. 3 and illustrating a second operative position of the parts.

Fig. 5 is a detail sectional view illustrating the drive connection for the reel, taken on line 5—5 of Fig. 3.

Referring to the drawing which illustrates the preferred embodiment of the invention, the numeral 10 designates a fishing rod or blade which may be of any suitable character or construction and which is preferably of solid cross-section. I prefer to use a rod 10 which is formed of metal, although a rod formed of bamboo or other material may be employed. The rod 10 mounts the usual guide lines (not shown) spaced along its length. In the form shown, the rear or inner end portion 12 of the rod 10 is of reduced diameter and a diagonal bore 14 is formed in the rod or blade open at the rear or end of the blade 10 and at the side of the blade 10 spaced forwardly from the reduced dimension portion 12 thereof.

The blade 10 is carried by a handle which is formed of two registering parts 16 and 18 each having substantially the same semi-circular cross-sectional contour through the major portion of its length and being normally positioned in face engagement at flat inner longitudinal surfaces thereof along the parting plane 20. The handle portions 16 and 18 may be formed of wood, plastic material or any other suitable material. For purposes of convenience I prefer to form the handle from a molded plastic material. The flat inner parting faces of the handle portions 16 and 18 are provided with grooves 22 extending from the forward ends thereof in substantial alignment with the inner end of the bore 14 of the blade and terminate at their rear end in communication with enlarged recesses 24 which serve to mount a fishing reel as described hereinafter. At a plurality of points along the grooves 22 which register when the parts are assembled, are provided guide sleeves 26, the same preferably being located at the forward and rear ends of the grooves and preferably being fixedly carried by one of said grooves and receivable in the groove of the other member so that said tubular member or sleeves 26 will be positioned in coaxial alignment and communication with the grooves 22 in the arrangement of the parts as assembled. For the purpose of insuring registry of the handle parts 16 and 18, one thereof is provided intermediate its ends with a pin 28 projecting from the parting face thereof and perpendicular thereto so that it may be received in a socket formed in the other handle part when the handle parts are assembled.

The opposite end portions of the handle are tapered, the rear or outer end being provided with a tapered surface 30 and terminating in a screw-threaded reduced end portion 32. A cup-shaped member or cap 34 fits around the end portions of the handle having an internally screw-threaded socket portion 36 adapted to mate with the threaded parts 32 upon the handle and having a forwardly projecting conical sleeve 38 which has a snug fit with the tapered surface 30 of said handle parts. The front end portions of the handle elements 16 and 18 are conically tapered at 40 and terminate in screw-threaded portions 42. A sleeve is provided with an intermediate internally screw-threaded portion 44 mating with the threads of the handle parts 42 and having a conical inner end portion 46 fitting snugly upon the tapered surface 40. The front end portion 48 of this sleeve defines a socket for receiving the reduced end portion 12 of the rod blade 10. It will be apparent that the combination of the end sleeves and the centering pin 28 assemble the two handle parts 16 and 18 operatively to provide a handle unit wherein the parts are firmly secured together but are readily disassembled as desired.

The recesses 24 in the handle parts 16 and 18 are preferably of cylindrical outline and of a diameter slightly less than the cross-sectional area of the handle parts, as best seen in Fig. 2. Each of the handle parts has a bore 50 therein of smaller size and concentric with said recesses 24. A liner member, preferably formed of metal, fits in the openings 24, 50 in each handle part, the same preferably comprising a large diameter cylindrical portion 52, a flat transverse wall portion 54 bearing against the inner end of the enlarged opening 24, and a reduced sleeve portion 56 fitting within the bore portion 50. These parts may be held to the handle parts which mount them in any suitable manner as by the use of securing means, adhesive means or simply by a snug fit in said openings.

An inturned flange 58 is formed at the outer end of the sleeve 56 mounted within the handle portion 18. The sleeve portion 56 within the handle portion 18 serves as a bearing for one end of a shaft 60 which extends transversely of the handle assembly with one end portion thereof reduced at 62 to project through the center opening of the flange 58. The sleeve portion 56 of the liner mounted within the handle part 16 preferably terminates inwardly from the outer surface of said handle member, and an enlarged mouth is formed in the said handle part at the outer end of the bore 50 which receives said sleeve. Said enlarged mouth receives an annular member 64 which is held in place in any suitable manner as by screw-threading the same into the handle. The inner diameter of the annular member 64 provides a snug sliding fit with one end of the shaft 60 which has clearance within the sleeve portion 56 by reason of the fact that the sleeve portion within the handle part 16 is of larger diameter than the sleeve 56 within the handle part 18. A line-winding reel 66 has an axial bore therein of a diameter to fit rotatably upon the shaft 60. The reel 66 is of a width to have only a slight clearance at its opposite side faces with the plates 54 of the liner, the clearance being sufficient, however, to permit free rotation of the reel between said plates. The reel is provided with the usual peripheral groove within which a line may be wound, and the sides of the groove are defined in part by side flanges 68 whose outer diameter is such as to provide only a small clearance between the same and the cylindrical parts 52 of the liner members.

The face of the reel 66 which is positioned at the side thereof fitting within the liner part carried by the rod handle part 16 is notched at 70 at a plurality of circumferentially spaced points and these notches are adapted to receive the ends of a cross-pin 72 preferably extending through the shaft 60. Thus in the Fig. 3 and Fig. 5 positions of the parts, the pin 72 is shown as seated in the notches 70, and in the Fig. 4 position the pin 72 is clear of said notches. Consequently, the reel 66 and the shaft 60 must rotate as a unit in the Fig. 3 and Fig. 5 positions, but the reel may rotate free and clear of the shaft 60 in the Fig. 4 position. A washer 74 encircles the shaft 60 outwardly of the cross-pin 72, and a coil spring 76 bears at its inner end against said washer and at its outer end against the annular member 64. The spring 76 normally serves to urge the shaft 60 to the Fig. 3 position. A notch or groove 78 is formed in the outer surface of the annular member 64 and is positioned diametrically thereof. This notch is adapted to receive the nose portion 80 formed on the bifurcated end of a crank arm 82 which is pivoted to the projecting end portion of the shaft 60 at 84. The outer end of the crank 82 mounts a handle 86. A recess 88 is formed in the handle part 16 in suitable position to receive said crank handle 86 in one pivoted position thereof with reference to its pivot axis 84.

A device of this character has for one of its principal purposes use for fishing through the ice in winter. For this purpose it is desirable that the line which is wound upon the reel 66 is formed of plastic material, such as the nylon line commonly available. Nylon line is available in a diameter of .009 inch, and I find that such a line is particularly well suited for use in this device. It will be understood that all passages or parts through which the line is to pass freely, such as the passages 14 and 22 and the inner diameters of the tubular members 26, will be of a diameter greater than .009 inch to permit free movement of the line therethrough. In instances, however, where it is desired to avoid passage of the line, for example, at the clearance space between the outer periphery of the flanges 68 of the reel and the inner periphery of the cylindrical liner parts 52, clearance will be less than the thickness of the line. At the latter point the clearance will preferably be not more than .003 inch. Thus when a line mounted upon a reel has been trained through the various passages, it may be played in and out with reference to the reel with assurance that no binding will occur in the passages; and, further, in the event the reel is accidentally operated to release line at a greater speed than it issues from the mouth of the opening 14 resulting in the loosening of the line encircling the reel, no danger of backlash or binding, wedging or other undesirable disabling of the device occurs. Avoidance of such disabling action results from the control of the clearance mentioned above, and also results from the fact that where nylon material is used it tends to avoid the formation of kinks therein and tends further to assume a uniform curvature. Stated differently, if the line is held against outward play through the mouth of the opening 14 and at the same time the reel is rotated in a direction to release the line, the action which occurs is the loosening of the line within the cavity mounting the reel in uniform coils or convolutions confined by the cylindrical metal liner in a manner so that each coil or convolution lies free and flat and does not tangle with adjacent convolutions.

In either of the two positions of the crank 82 illustrated respectively in full and in dotted lines in Fig. 1, the nose portion 80 of said crank lies flat against the outer face of the annular member 64, thereby permitting the spring 76 to urge the pin 72 into seating engagement with the reel. In the full line position shown in Fig. 1, this conditions the reel for full control by the handle 82, and, in the dotted line position shown in Fig. 1, it serves to lock the reel positively against rotation because of the inner engagement of the pin and slot connection 70, 72 and the seating of the crank handle 86 within the recess 88. In the event it is desired to disengage the reel from the shaft, this may be accomplished in several ways. Thus the crank 82 may be swung to the position shown in Fig. 4, wherein the nose 80 of the crank seating in the notch 78 presses against the annular member 64 to move the shaft 60 in an axial direction against the action of the spring 76. This disengages the pin 72 from the sockets 70 of the reel so that the reel may run free.

A second means for releasing the reel from the shaft constitutes the reduced pin portion 62 projecting from the handle at the side thereof opposite that at which the crank 82 is mounted. Inward pressure upon the part 62 bodily shifts the shaft 60 in an axial direction against the spring and thus accomplishes the adjustment of the parts for free rotation of the reel without requiring manipulation of the crank. It will be apparent, therefore, that whenever it is desired to play out line rapidly without turning the crank, either of two means may be employed, the latter means, namely pressure upon the shaft end 62, being the most convenient and rapid and therefore affording the best control of the rate and extent of release of the reel for free rotation and reengagement thereof by the crank-operated mechanism. It will be apparent that by pressing upon the shaft end 62, the reel may be released for free rotation even when the crank handle 86 is seated within recesses 88 in the handle of the rod.

By virtue of the two-part construction of the handle and the simplicity of the means for assembling the said parts and locking them in desired complementary relation, it is possible to assemble and disassemble the device, as for purposes of replacement of a line or for repair of worn parts, very quickly. Observe also that the two-part construction reduces the amount of threading of the line which must occur. In other words, the only points at which the line must be threaded through any part which does not separate is at the tubular guides 26 and at the blade bore 14. Thus in assembling the device, the free end of the line is easily threaded in place at these restricted points, and the remainder of the line is permitted to rest in a groove 22 with the assurance that when the parts of the handle are brought together a complete and confining bore for the line will be provided. The mounting of the reel in a separable liner provides for separation of the housing parts at the same time the handle parts separate. When the handle parts are so separated, the action which occurs is merely a pulling of the handle part 13 and its liner away from the reel and the shaft 60. No securing members other than the end caps 36, 44 need be utilized to hold the parts together, and especially it will be observed that no securing members are employed in conjunction with the reel. The reel itself can be freely pulled from its shaft 60 after the handle parts are separated, and thus all parts of the device are exposed with the exception of the shaft 60 which is held in place by the member 64 against which the spring 76 bears. In the event the shaft is to be removed, the annular plate 64 is released. This provides for quick initial assembly of the parts, quick reassembly thereof after repair, and serves additionally to reduce the number of parts and the operations required to assemble them. A reel of this character thus meets satisfactorily all conditions of use by reason of the various characteristics thereof herein mentioned and is a very convenient fishing implement.

While the preferred embodiment of the invention has been illustrated and described herein, it will be understood that changes in the construction may be made within the scope of the appended claim without departing from the spirit of the invention.

I claim:

A fishing reel adapted to be mounted in a cavity of a fishing rod having a transverse bore and a line guide passage each communicating with said cavity, comprising a metal liner for said cavity and bore having spaced end walls and a cylindrical wall portion within said cavity, a shaft adapted to extend through said bore and to project therefrom at its opposite ends, said shaft being journaled in and axially shiftable in said liner, a reel journaled on said shaft and adapted to be rotatably confined within said cavity, said reel having a rotative clearance in said liner at said end wall portions and at said cylindrical wall portion less than the thickness of a fishing line wound on said reel, a crank mounted on a projecting portion of said shaft, a releasable clutch forming a driving connection between said reel and shaft and including a radially projecting pin carried by said shaft and a plurality of radially projecting shoulders carried by one end of said reel, and a spring urging said pin in engagement with said shoulders, said shaft being axially slidable relative to said reel to disengage said pin and shoulder.

MATTHEW E. LEE.

References Cited in the file of this patent

UNITED STATES PATENTS

| Number | Name | Date |
|---|---|---|
| 195,578 | Copeland | Sept. 25, 1877 |
| 220,776 | Wardwell, Jr. | Oct. 21, 1879 |
| 436,302 | Corbin | Sept. 9, 1890 |
| 686,647 | Booth | Nov. 12, 1901 |
| 838,915 | Sykes | Dec. 18, 1906 |
| 865,613 | Schreidt | Sept. 10, 1907 |
| 1,007,443 | Hall | Oct. 31, 1911 |
| 1,348,193 | Wenderhold | Aug. 3, 1920 |
| 1,605,710 | Ford | Nov. 2, 1926 |
| 1,735,026 | Welch | Nov. 12, 1929 |

FOREIGN PATENTS

| Number | Country | Date |
|---|---|---|
| 71,866 | Austria | June 10, 1916 |